UNITED STATES PATENT OFFICE.

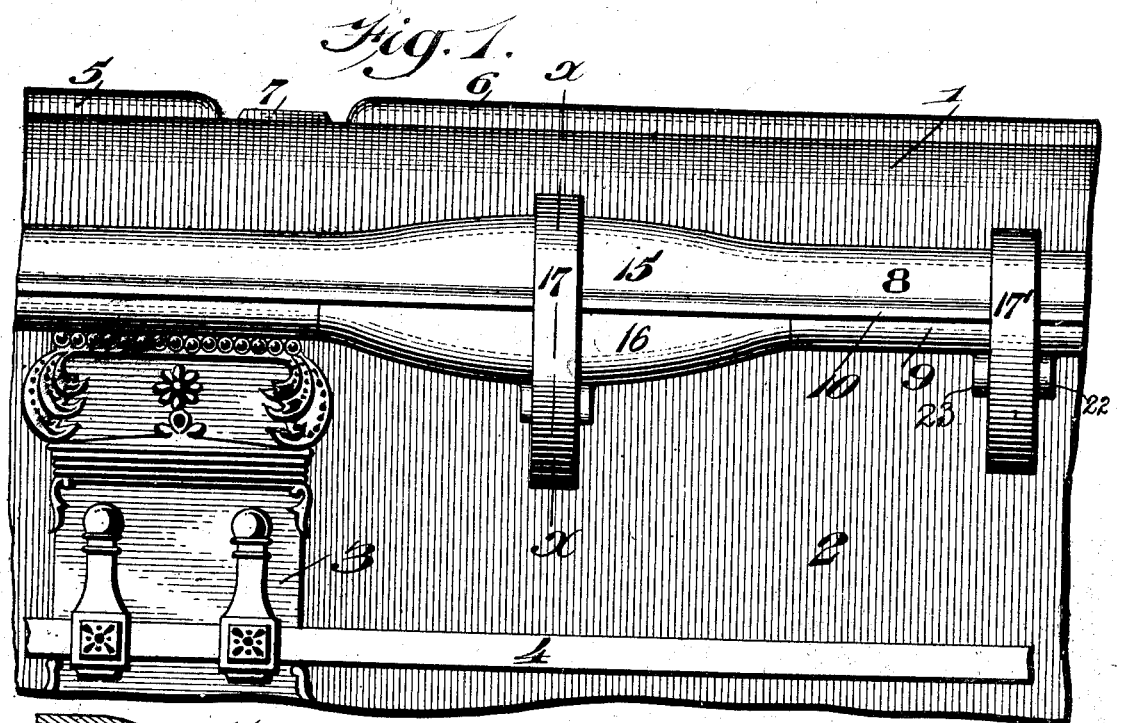
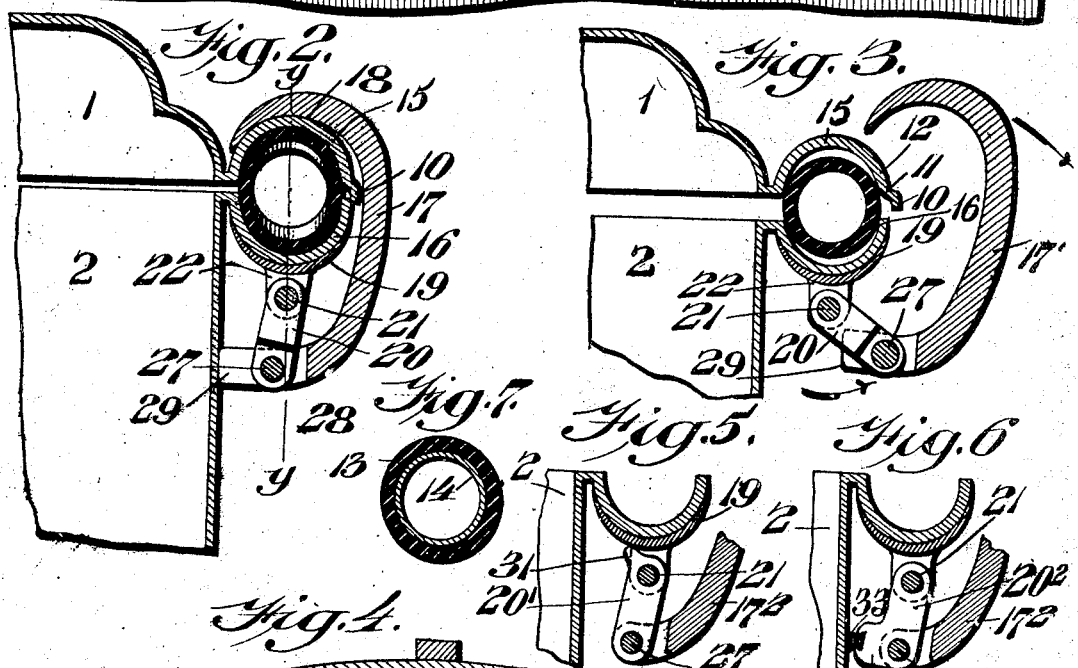

LEVI H. MONTROSS, OF CAMDEN, NEW JERSEY.

CASKET-SEALING MEANS.

987,906.   Specification of Letters Patent.   Patented Mar. 28, 1911.

Application filed February 5, 1908, Serial No. 414,403. Renewed August 11, 1910. Serial No. 576,674.

*To all whom it may concern:*

Be it known that I, LEVI H. MONTROSS, a citizen of the United States, residing in the city and county of Camden, State of New Jersey, have invented a new and useful Casket-Sealing Means, of which the following is a specification.

The purpose of my invention is to reduce the cost and increase the efficiency of metallic caskets.

A further purpose of my invention is to provide a clamp of such construction that it cannot become separated from the casket.

A further purpose of my invention is to provide a tube of novel construction for sealing purposes.

A further purpose of my invention is to provide means for engagement with the clamp which shall be capable of construction in a die press proper and as part of the manufacture of the casket.

A further purpose of my invention is to provide an enlargement of the sealing flange of a metal casket by swelling the said flange for engagement of a clamp.

A further purpose of my invention is to fasten a clamp by lever action and to secure the clamp in its said position by moving the lever beyond the center line of strain.

A further object is to provide a sealing gasket that will automatically distribute the clamping pressure evenly throughout the entire boundary of juncture and obviate the necessity for exact parallelism of sealing flanges.

It further consists of other novel features of construction, all as will be hereinafter fully set forth.

Figure 1 represents a fragmentary side elevation of a construction embodying my invention. Fig. 2 represents the same in fragmentary cross-section upon line *x—x* of Fig. 1. Fig. 3 represents another position of the parts in Fig. 2 in similar cross section. Fig. 4 represents a longitudinal section of the construction shown in Fig. 2 upon line *y—y*. Figs. 5 and 6 represent modified forms of clamp checking means. Fig. 7 represents the tube used by me in cross-section.

Similar numerals of reference indicate corresponding parts in the figures.

Referring to the drawings:—1 designates the cover and 2 the body of a casket having handle support 3 and bar handle 4. I have illustrated it as suitably paneled at 5, 6 and 7 and to provide for decoration and name plate. The seal between the parts is made by means of flanges 8 and 9 connected with the cover and body respectively, of which flange 8 is preferably provided with an extension 10 overlapping the lower or body flange when in position. The corner on the inside of the flange at 11 Fig. 3 is preferably rounded as also the bend at 12 to avoid pinching and consequent puncturing of the packing or sealing tube employed in the engagement of the parts, said tube being placed between the flanges 8 and 9 and consisting preferably of a rubber coating 13 surrounding a lead tubing 14, both being normally of a size slightly in excess of the space between the two flanges 8 and 9 so that it will be unnecessary to inflate or otherwise act upon the tube for engagement of the parts, all that will be necessary being to rest the cover of the casket upon the body thereof with the tube between, bring the clamps into engagement as hereinafter stated, and set them, the act of setting them distributing the pressure in the tubing so as to cause it to press against the entire inner surfaces of the flanges even if they be not exactly uniform or smooth.

I may enlarge the flanges 8 and 9 at 15 and 16 in general elliptical shape desirably enlarging in one direction only, as best seen in Fig. 2, making the distance from side to side at this enlargement the same as the distance from side to side throughout the remaining portion of these flanges corresponding to the inner diameter thereof. This can easily be done by die pressing the parts either during the pressing of the casket members or at a different time therefrom. The purpose is to provide a wedge for engagement by some clamp, of which I have shown one desirable form in my Patent, No. 819,301, granted May 1st, 1906 or to provide a trussed surface without sharp joining corners against which my clamp 17 here disclosed and claimed may be used. Evidently this need not be enlarged for the clamp if the truss effect be not desired, as a clamp 17' of the same character can be used anywhere through the normal joining flanges as seen at the right hand in Fig. 1. Of the clamp 17 (or its form 17') the upper inner surface 18 is arranged to conform to the shape of the outer surface of the upper or cover flange as at 15.

To the lower or body flange, as at enlargement 16, I preferably attach a stiffening strip 19 for the double purpose of strengthening the same, and principally, of providing means for attachment of a link 20 which is pivoted as by bolt 21 in ears 22 and 23 which may be secured to the strengthening strip in any suitable manner as by punching them out from the spaces 24 and 25 thereof. The strengthening strip may be secured to the lower member, or body flange 16 in any suitable manner with or without puncture thereof. I have preferred to illustrate riveting thereof at 26. The link 20 is pivoted to the lower part of the clamp 17 by pivot 27 passing preferably within the yoke formed by cutting away a portion of the clamp at 28 to leave side extensions thereof at 29 and 30. It will be evident that other means of arranging this connection between the clamp and the lower part 16 may be made use of to provide movement of the parts while preventing total disengagement of the clamp from the members and that other suitable form of such attachment of the clamp to the casket member may be applied to a form of reinforced flange such as shown in Patent No. 819,301, granted to me May 1, 1906.

I attain another advantage by the link connection made use of by me than attachment of the parts, as I make use of the link to permit setting of the clamp by mere pressure of the lower portion of the clamp inwardly after engagement of the upper portion thereof with the upper enlarged part 15 of the flange 8. The way in which this is completed will be evident from Figs. 2 and 3 where in Fig. 3 the clamp is shown disconnected from the meeting parts, the pivot 27 being outside of the line of strain between the upper inner surface 18 of the clamp and the pivot 21 which line of strain follows approximately the line $y-y$. It will be evident that movement to the position shown in Fig. 2 locks the clamp in position at the same time that engagement of extensions 29 and 30 with the casket or with extensions therefrom prevents further movement of the lower part of the clamp toward the casket and consequent loosening of the clamping action.

In order to show that the means for preventing excessive inward movement of the lower part of the clamp is not limited to the particular form shown, I have illustrated two of the many other forms which might be used, showing these in Figs. 5 and 6. In Fig. 5 the nose or lug 31 upon the link engages with the reinforcement to stop movement of clamp $17^2$ while in Fig. 6 an arm 32 from the link takes the place of the extensions of 29 and 30 in engaging with the casket member. The arm 32 terminates in a cushion 33 which can, of course, be applied to any of the other forms to prevent vibration or noise.

It will be evident that the setting of the clamp by any suitable means will cause compression of the tube throughout the normal size of the tubular space formed between the upper and lower flange members with consequent swelling of the tube at the clamping point to fill the enlarged space between these upper and lower flanges at these places. Where no enlargement is used the sealing takes place throughout a substantially uniform tubular gutter surrounding the casket. It will be further evident that the amount of compression may be estimated or determined so as to place any required or desired ultimate pressure upon the tube when the parts are in set position. It will be further evident that this tube may be filled with any desired non-injurious or protective fluid which may be in the form of gas or liquid and that the latter may become "set" or not as desired, permitting the use of oils or other liquids or of cements and that the cements may be "air" or "time" set as desired.

Having thus described my invention, what I claim as new and desire to secure by Letters Patent, is:—

1. In a metallic burial casket, a body, and a cover, having respectively flanged meeting sealing parts in combination with a clamp adapted to engage said parts.

2. In a metallic burial casket, the combination with the body and cover having laterally extended coöperating semicircular flanges, enlarged at intervals, of clamps adapted to engage said enlargements and a gasket filling the normal space between said flanges and their enlargements.

3. In a burial casket, the combination with the body and cover portions having lateral extensions thereon, said extensions being oppositely swelled to form enlargements, of a gasket between the extensions, a clamp member adapted to engage the upper of the opposite swelled portions, a link and pivots for said link upon the clamp and lower swelled portion, the link being longer between its pivots than the distance required to set the clamp.

4. In a metal burial casket, the combination with the cover and body casket members laterally flanged to provide coöperating semi-tubular sealing extensions, of a clamp member engaging one of said extensions, and a link and pivots connecting the other of said extensions with the clamp and forming with the extension when in position a toggle for setting the clamp.

5. In a metallic burial casket, the combination with the body and cover members and flanged coöperative extensions thereon, of a gasket within said extensions, a clamp for said members, and a link connected with said clamp and one of said members for tightening said extensions.

6. In a metal burial casket, the combination with the cover and body casket members, lateral flanges thereon providing coöperating tubular extensions, of a clamp adapted to engage one of said extensions, toggle means for seating the clamp, and means limiting the movement of the clamp to approximately its toggle movement.

7. In a metal burial casket, the combination with the cover and body casket members laterally flanged to provide coöperating and semi-tubular or sealing extensions, of a clamp member a link pivotally connected with one of said extensions and the clamp member, and an extension upon one of the movable parts to engage with a fixed part and thus limit the movement of the clamp after the clamp has passed the position of maximum strain.

8. In a metal burial casket, the combination with the cover and body casket parts terminating in lateral coöperating sealing extensions, of a tube adapted to lie between said extensions and of greater diameter than the diameter of the tubular space formed between the extensions, and a toggle-operated clamp adapted to engage one of the extensions.

9. In a metal burial casket, the combination with the cover and body casket parts terminating in lateral coöperating sealing extensions, of a compound tube comprising inner and outer members of which one is lead and the other rubber.

10. In a metal burial casket, the combination with the cover and body casket parts terminating in lateral coöperating sealing extensions having a non-uniform space between, of a gasket located in said extension and so formed that when compressed at one point it will correspondingly expand in other parts, thereby equalizing the pressure for the whole sealing boundary, and means for causing said compression.

11. In a metal burial casket, the combination with the cover and body portions, having coöperating sealing extensions therefor providing a space between said extensions, of a gasket adapted to lie in said space, a clamp for engagement with the exterior of one of said extensions, a link, and means for pivoting the link to the clamp and to the other extension so that the space between the pivot points shall be longer than the distance required to set the clamp.

12. In a metal burial casket, body and cover portions having lateral sealing extensions thereon, in combination with a closed tube, adapted to hold a fluid, a clamp for compressing said tube and a toggle-like means for operating said clamp.

13. In a device of the character stated, upper and lower casket members coöperatively grooved throughout their meeting edges to provide a space therebetween of variant size at different points about the edges in combination with a tube for said space, adapted to hold a fluid, and means for compressing the tube to cause it to swell into the larger parts of the space provided by the grooves.

LEVI H. MONTROSS.

Witnesses:
W. S. Jackson,
C. D. McVay.